Patented Mar. 12, 1935

1,993,913

UNITED STATES PATENT OFFICE 1,993,913

PROCESS OF PREPARING STABILIZED CHLORINATED RUBBERS

Wilhelm Becker, Cologne-Mulheim, and Alfred Blömer, Imbach, near Opladen, Germany, assignors to I. G. Farbenindustrie Aktiengesellschaft, Frankfort-on-the-Main, Germany No Drawing. Application November 6, 1933, Serial No. 696,908. In Germany April 26, 1932

3 Claims. (Cl. 106—23)

The present invention relates to a process of preparing stabilized chlorinated rubber, more particularly it relates to a process which comprises dissolving chlorinated rubber in a suitable organic solvent and introducing the solution thus obtained into an organic precipitating bath, containing alkaline reacting substances in such a quantity that the pH value of the precipitating bath amounts to 11 or more. Preferably we use as precipitating agent a water soluble alcohol, such as methanol or ethanol. The alkaline reacting substances may be dissolved in a suitable organic solvent and may be then added to the precipitating bath. On the other hand the alkaline reacting substances may be made up to a concentrated aqueous solution and then be added to the precipitating bath.

The solution of the chlorinated rubber is preferably freed from any free hydrochloric acid by a preliminary heating process and/or by reducing the pressure.

A preferred way of carrying out our process comprises the step of maintaining the precipitated product for a prolonged time in the alkaline precipitating bath, if desired, while heating and adding, if necessary, a further quantity of alkaline reacting substances, in order to maintain the alkaline reaction of the precipitating medium.

It is advantageous to run the solutions of the chlorinated rubber into a precipitating bath either in the diluted state or in a comparatively slow manner.

In this way the chlorinated rubber is obtained in form of a finely grained powder possessing a great surface.

The products obtainable by our process yield—suitably after a short washing process, which may be carried out with the aid of methanol or water, and after drying at a temperature, for instance, of 60 to 80° C.—chlorinated rubber products which dissolve to clear solutions and represent in the dry state pure compounds of a high degree of stability.

The following examples illustrate the invention, without, however, limiting it thereto, the parts being by weight:—

Example 1

A solution of 25 parts of light crepe in 800 parts of carbon tetrachloride is chlorinated at room temperature. After the chlorination the solution is heated to boiling for 6 hours while distilling off 240 parts of carbon tetrachloride. The solution thus obtained is then precipitated with 560 parts of methanol, to which such an amount of a 20% methylalcoholic caustic potash solution is added that the precipitating bath maintains an alkaline reaction after 15 hours stirring at room temperature. Thereupon the precipitated chlorinated rubber is filtered by suction, washed with methanol and dried. The product obtained is of a high degree of stability.

Example 2

Into a solution of 100 parts of smoked sheets in 1500 parts of carbon tetrachloride 300 parts of chlorine are introduced. After the chlorination is complete, the solution is heated to boiling on the reflux condenser for 12 hours. The solution is then precipitated with 1500 parts of methanol, to which a sufficient quantity of 33% caustic soda solution has been added, and stirred at room temperature for 20 hours. The precipitated product is washed neutral with methanol and water and then dried at a temperature of 60° C.

Example 3

A solution of 25 parts of light crepe in 800 parts of carbon tetrachloride is chlorinated and then evaporated in the vacuo at a temperature of 40° C. to a content of 600 parts. The solution is then poured into methanol, to which previous to the precipitation a sufficient quantity of a 50% caustic potash solution has been added. After standing for 15 hours the chlorinated rubber is filtered by suction, washed with methanol and dried at a temperature of 60° Co.

Well stabilized chlorinated rubbers can also be obtained when substituting for the caustic alkalies, in the above examples, a sufficient quantity of guanidine or diphenylguanidine.

We claim:—

1. In the manufacture of chlorinated rubber an isolation and stabilization process for the product which comprises introducing organic solutions containing the same into an organic precipitating bath containing alkaline reacting substances in such a quantity as to impart to the precipitating bath a pH value of 11 or more, thereby effecting instantaneous precipitation of the chlorinated rubber and maintaining the alkaline reaction of the bath while it is in contact with the precipitated product.

2. In the manufacture of chlorinated rubber an isolation and stabilization process for the product which comprises introducing organic solutions containing the same into a precipitating bath comprising a water soluble alcohol and caustic alkali in such a quantity as to impart to the precipitating bath a pH value of 11 or more, thereby effecting instantaneous precipitation of the chlorinated rubber, and maintaining the alkaline reaction of the bath while it is in contact with the precipitated product.

3. In the manufacture of chlorinated rubber an isolation and stabilization process for the product which comprises introducing organic solutions containing the same into a precipitating bath comprising a water soluble alcohol and caustic alkali in such a quantity as to impart to the precipitating bath a pH value of 11 or more, thereby effecting instantaneous precipitation of the chlorinated rubber, leaving the precipitated product for a prolonged time in the alkaline reacting precipitating bath and maintaining the alkaline reaction of the bath while it is in contact with the precipitated product.

WILHELM BECKER.
ALFRED BLÖMER.